(No Model.)
G. WELLS.
CULTIVATOR.
No. 467,570. Patented Jan. 26, 1892.
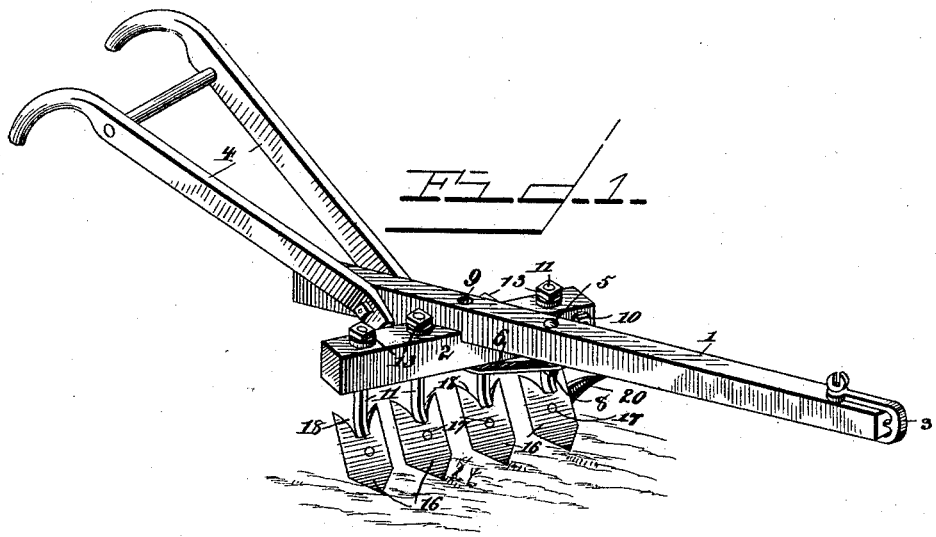
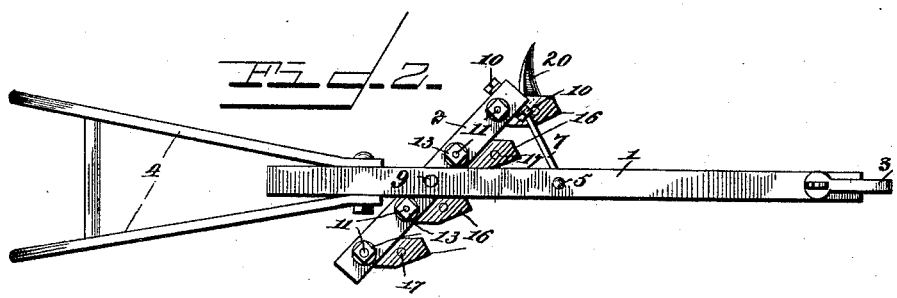
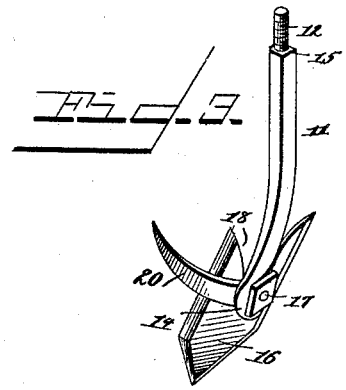
Witnesses:
H. S. Dietrich
W. S. Duvall
Inventor
George Wells.
By his Attorneys,
C. A. Snow & Co.

UNITED STATES PATENT OFFICE.

GEORGE WELLS, OF CHESTER, ARKANSAS.

CULTIVATOR.

SPECIFICATION forming part of Letters Patent No. 467,570, dated January 26, 1892.

Application filed February 28, 1891. Serial No. 383,293. (No model.)

*To all whom it may concern:*

Be it known that I, GEORGE WELLS, a citizen of the United States, residing at Chester, in the county of Crawford and State of Arkansas, have invented a new and useful Cultivator, of which the following is a specification.

This invention relates to improvements in cultivators, my object being to provide a cultivator of cheap and simple construction, adapted to cultivate between the rows of cotton or corn, and so constructed as to thoroughly cultivate the centers and sides of the rows and in such a manner as to entirely rid the same of trash, briers, and weeds and obtain a thorough pulverization, while at the same time to obviate any injury to the plants themselves.

Various other minor objects of my invention will appear in the following description, and the novel features thereof will be particularly pointed out in the claims.

Referring to the drawings, Figure 1 is a perspective of a cultivator constructed in accordance with my invention. Fig. 2 is a plan of the same. Fig. 3 is a detail in perspective of one of the cultivator-standards.

Like numerals of reference indicate like parts in all the figures of the drawings.

In practicing my invention I employ the usual main beam 1 and let into the under side of the same the transverse cultivator bar or head 2, which I dispose at an angle to the beam 1. The beam 1 is provided at its front end with the usual clevis 3 and at its rear end, in rear of the bar or head 2, with the usual diverging handles 4. A bolt 5 passes vertically through the beam 1 in front of the bar 2 and also passes through the front ends of a pair of braces 6 and 7, under which it is nutted, as at 8. The brace 6 is deflected downward slightly, so as to pass under the bar 2, and a bolt 9 passes down through the beam 1, the bar 2, and the brace, at which point it is nutted. The brace 7 is laterally disposed and passes through the adjacent end of the bar 2, is threaded at each side of the bar, and nutted, as at 10. At each side of the beam 1 the bar 2 is provided with rectangular openings, through which are passed the shanks of as many standards 11. The shanks 11 are rectangular for the major portion of their length, so as to agree with the openings and have their upper ends reduced and threaded, as at 12, to receive securing-nuts 13. The lower halves of the standards are curved forwardly and terminate in flattened portions 14, forming at the upper ends of said portions shoulders 15.

16 designates the cultivator-shovels, one of which is secured to each standard by a single bolt 17. These shovels have their front ends reduced to form points and are provided at their upper edges with substantially V-shaped cut-out recesses 18, the bottoms of which abut against the shoulders of the standards, and at each side of the standards the shovels extend. To that shovel located adjacent to the growing plants may be secured by its single bolt a V-shaped cutter 20, said cutter being interposed between the shovel and standard and extending laterally from the side of the shovel, so as to cut close to the side of the row. By employing the knife or cutter just mentioned, the cultivator may be run such a distance from the plants as will obviate any liability of injury to their roots, and at the same time the cutter will efficiently destroy all briers and weeds and pulverize the ground adjacent to the stalks. If desired, also, the knife may be swung up in rear of the shovels or may be entirely removed when not in use.

A cultivator constructed as above, it will at once be apparent, contains many superior advantages, will be found efficient, durable, simple of construction, and capable of being produced at a minimum cost.

Having described my invention, what I claim is—

In a cultivator of the class described, the combination, with the cultivator-bar having rectangular openings, of rectangular standards passed through said openings, terminating above the same in cylindrical threaded ends and nutted and having their lower portions forwardly bent and flattened, the cultivator-shovels provided with reduced front ends, the single bolt passed through the flattened end of each standard, and the shovel and the V-shaped blade mounted adjustably upon the bolt of the outer shovel and adapted to fold up in rear of the same, substantially as specified.

In testimony that I claim the foregoing as my own I have hereto affixed my signature in presence of two witnesses.

GEORGE WELLS.

Witnesses:
W. H. RANKIN,
W. J. MILLER.